April 25, 1967     JEAN-MICHEL BALUTEAU     3,316,051
OPTICAL SYSTEM OF VARIABLE FOCAL LENGTH HAVING THREE
CONSECUTIVE MOVABLE ELEMENTS
Filed July 8, 1963

3,316,051
OPTICAL SYSTEM OF VARIABLE FOCAL LENGTH HAVING THREE CONSECUTIVE MOVABLE ELEMENTS
Jean-Michel Baluteau, Livry-Gargan, France, assignor to Societe d'Optique et de Mecanique de Haute Precision, Paris, France, a French company
Filed July 8, 1963, Ser. No. 293,358
Claims priority, application France, July 11, 1962, 903,659
3 Claims. (Cl. 350—43)

The invention relates to an optical system of variable focal length.

This optical system has the object of forming the image of a fixed object in a substantially fixed plane, the size of the image thus formed being capable of continuous variation, and the fixed object moreover being capable of taking the form of an image already formed by an objective.

According to the invention, the system comprises three consecutive optical elements capable of moving with respect to a fixed object, each optical element being equivalent to a thin lens, the two end movable elements having an identical movement, and the displacement of the central element being proportional to the displacement of the end elements, a mechanical control device for the optical elements imparting simultaneous displacements to the said elements over definite distances.

The optical system gives an image of a fixed object situated in a plane P, and the system may be so calculated that the plane of this image passes four times through a given position for a selected variation in magnification of the said image. A simple way of making this calculation and obtaining the focal lengths and strokes of the lenses will now be explained with reference to the appended drawings.

Figure 1:
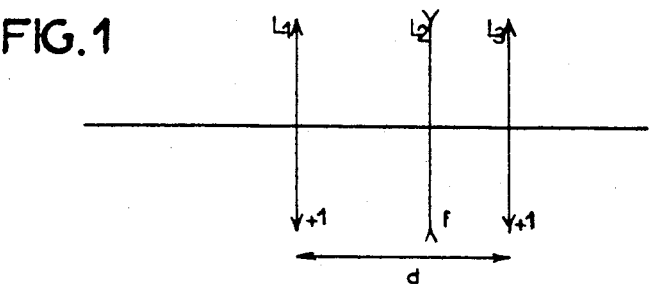
FIGURES 1 to 4 illustrate the method of calculation for one embodiment of the invention.

Consideration may first of all be given to a system of three thin lenses $L_1$, $L_2$, $L_3$ (FIGURE 1) whereof the first and third have a power of $+1$, and are situated at a fixed distance $d$ from one another. The intermediate lens $L_2$, assumed to be movable, is such that the group ($L_1$, $L_2$, $L_3$) is afocal when the intermediate lens makes contact with the first or the third. Under these conditions, if the magnification of the group is designated by $g$ when $L_2$ is in contact with $L_3$, and the focal length of the lens $L_2$ by $f$, the basic formulae enable the following to be written down:

$$g=\frac{-\left(1+\frac{1}{f}\right)}{1} \text{ whence } f=\frac{-1}{1+g} \quad (1)$$

and $$d=1+\frac{1}{1+\frac{1}{f}} \text{ whence } d=\frac{g-1}{g} \quad (2)$$

Figure 2:
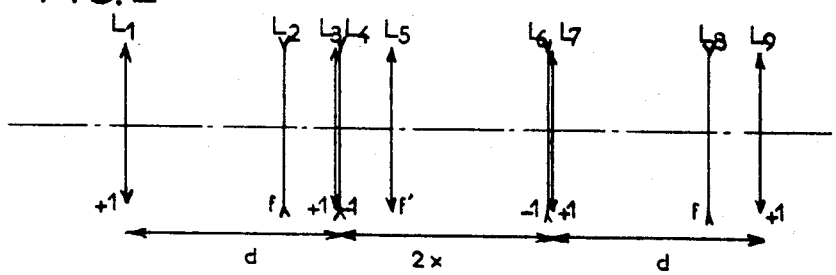

Two systems such as those defined above ($L_1$, $L_2$, $L_3$) and ($L_7$, $L_8$, $L_9$) are then placed on either side of a system ($L_4$, $L_5$, $L_6$) (FIGURE 2), so that the lens $L_4$ merges with $L_3$, and $L_6$ with $L_7$. The two lenses $L_4$ and $L_6$, having a power of $-1$, are placed at a distance of $2x$ from one another. The intermediate lens $L_5$, assumed to be movable, has a focal length of $f'$, and is such that the group ($L_4$, $L_5$, $L_6$) is afocal when the intermediate lens makes contact with $L_4$ or $L_6$.

Writing down that the distance $2x$ is the algebraic sum of the focal lengths of the end elements when $L_5$ is in contact with $L_6$ leads to a relationship linking $x$ and $f$.

$$2x=-1+\frac{1}{\frac{1}{f'}-1}\quad \frac{1}{f'}=\frac{1}{2x+1}+1 \quad f'=\frac{2x+1}{2x+2} \quad (3)$$

It will furthermore be seen that the two thin groups $L_3$, $L_4$ and $L_6$, $L_7$, having a power of zero, do not play any part: they may therefore be eliminated. The system ($L_1$, $L_2$, $L_5$, $L_8$, $L_9$) will be considered hereinafter, and a second relationship between $f'$ and $x$ will be written down in order to fix these two values. For example, it may be written down that the system is afocal when $L_2$, $L_5$ and $L_8$ have traversed half their respective strokes.

Figure 3:
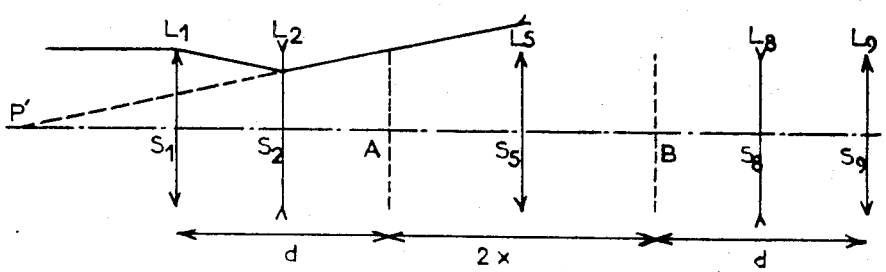

In this case, the system is perfectly symmetrical (FIGURE 3). An object at infinity having the image P' through the two lenses $L_1$ and $L_2$, and the system ($L_1$, $L_2$, $L_5$, $L_8$, $L_9$) being symmetrical, it may be written down that:

$$\overline{S_5P'}=-2f'$$

The abscissa P' is therefore calculated with respect to A from the focus of the group $L_1$, $L_2$, the plane A situated at the distance $d$ from ($L_1$) being the plane where the previously eliminated group $L_3$, $L_4$ was situated. The following is obtained:

$$\overline{AP'}=p'=-\frac{1}{2}-\frac{g^2+2g-1}{2g(1+g^2)}$$

$$\overline{S_5P'}=\overline{S_5A}+\overline{AP'}=p'-x$$

$$p'-x=-2f'=-\frac{2x+1}{x+1}$$

so that:

$$f(x)=x^2-x(1+p')-(1+p')=0 \quad (5)$$

A rapid discussion gives the different solutions to the problem. It should first of all be stated that the quantity $$d=\frac{g-1}{g}$$

must be positive. Consequently, $g$ will be taken as $>1$ or $<0$.

Moreover, the roots of the equation $f(x)=0$ must also be positive if they are to be suitable. In order to determine the case in which these roots are positive it is advantageous to investigate the sign of the function:

$$1+p'=\frac{1}{2}-\frac{g^2+2g-1}{2g(1+g^2)}$$

Figure 4:
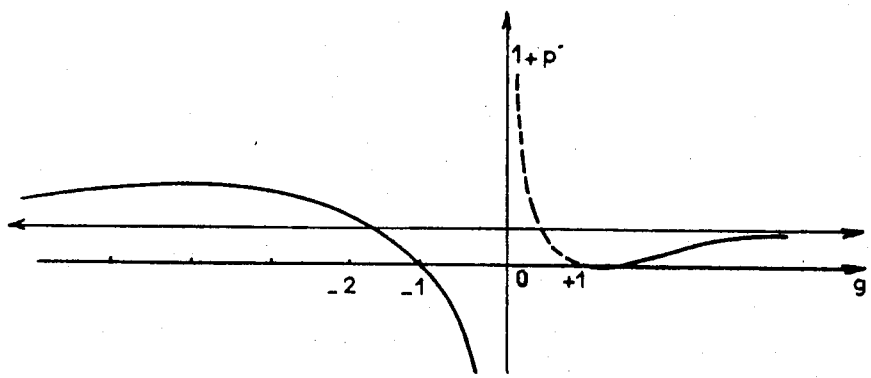

Investigation of this function, which is summarily illustrated in FIGURE 4, shows, that it is always positive except for values of $g$ between $-1$ and $0$.

When $(1+p')$ is negative, the product of the roots of the equation $f(x)=0$ is positive, and the sum of the roots is negative. Both roots are therefore negative, and are not suitable.

When $1+p'$ is positive, the equation $f(x)=0$ always has two roots of opposite signs. In fact, the product of these roots has a value of $-(1+p')$, and is negative. Only the positive root of the equation is suitable.

The equation $f(x)=0$ therefore has one positive root and only when $1+p'$ is positive, that is to say when the magnification $g$ is either less than $-1$ or greater than $+1$ (these two cases will now be examined).

*Case in which g has a value of less than $-1$*

Figure 5:
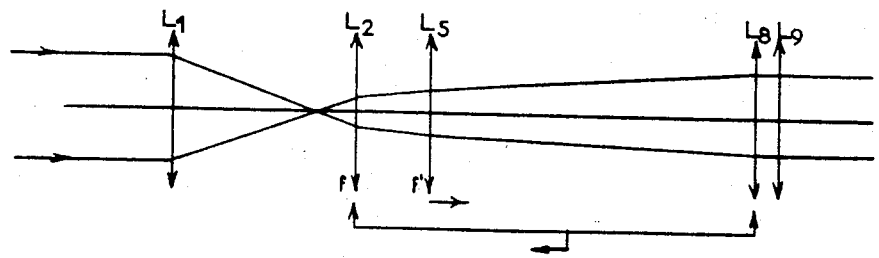
FIGURE 5 shows a variant of embodiment of the invention.

The focal length $f$ is positive, and the interval $d$ is greater than 1. There is therefore a true image between $L_1$ and $L_5$, and the lens $L_2$ passes into the plane of this image when it carries out its stroke $d$. Solution of $f(x)=0$ gives half the stroke $x$ of the lens $L_5$; finally, relationship (3) determines the focal length $f'$, which is positive in all cases. This leads to the arrangement shown in FIGURE 5. The lenses $L_2$ and $L_5$ must be displaced in opposite directions if their effects are to be added in varying the magnification, and the lens $L_8$ will naturally have the same movement as $L_2$. When $L_2$ and $L_5$, which are assumed first of all to be in contact, move away from one another, the movements being proportional in the ratio of $d/2x$, the magnification of the group ($L_1$, $L_2$, $L_5$, $L_8$, $L_9$) changes from a value of $G>1$ to a value of $1/G$.

The system is strictly afocal,
(1) in the intitial position: $L_2$ in contact with $L_1$ and $L_5$ merged with $L_8$.
(2) in the intermediate position, when $L_2$ and $L_8$ have been displaced by $d/2$ and $L_5$ by $x$.
(3) in the final position, when $L_2$ is in contact with $L_5$ and $L_8$ in contact with $L_9$.

*Case in which g has a value of greater than +1*

Figure 6:
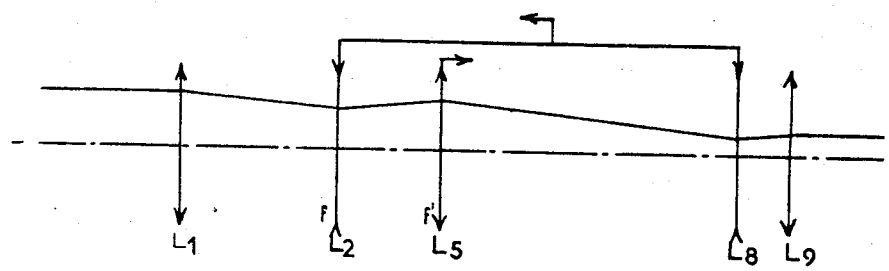
FIGURE 6 shows one form of embodiment.

In this case, the focal length $f$ is negative, and the distance $d$ less than $+1$. The focal length $f'$ is always positive. This leads to a system similar to that in FIGURE 6. The lens $L_5$ must be displaced in the opposite direction to $L_2$ and $L_8$. If $L_2$ and $L_5$ are translated proportionately in the ratio of $d/2x$, the magnification of the group decreases from the value $G>1$ to $1/G$ when they move away from one another, $L_8$ always having the same movement as $L_2$.

*Example.*—If $g$ is made equal to 1.3, there is no intermediate image, and it is found that:

$$f=-0.434782 \quad d=0.230769$$

the quantity $P'$ assumes the value:

$$p'=-\frac{1}{2}-\frac{1.69+1.6}{2.6\times 2.69}=-0.970403$$

the equation $f(x)$ becomes:

$$x^2-0.029597x=0.029597=0$$

whence $$2x=0.374943$$

and $$f'=0.578937$$

When the lenses $L_2$ and $L_5$ are in contact, the system is afocal, and its magnification is: 2.323654.

At mid-stroke, the magnification of the system is 1; finally, when $L_5$ and $L_8$ are in contact the magnification is: 1/2.323654.

The ratio $k$ between extreme magnifications is $$k=5.399368$$

The lenses $L_1$ and $L_9$ have been introduced for convenience in calculation. It is clear that they may be eliminated. The system then reduces to the three lenses $L_2$, $L_5$, $L_8$ which give a variable-magnification transfer between two planes, which are respectively: the focal image plane of $L_1$ and the focal object plane of $L_9$. If only $L_9$ is eliminated, this gives a group ($L_1$, $L_2$, $L_5$, $L_8$) which gives a variable-size true image of an object situated at infinity.

Figure 7:
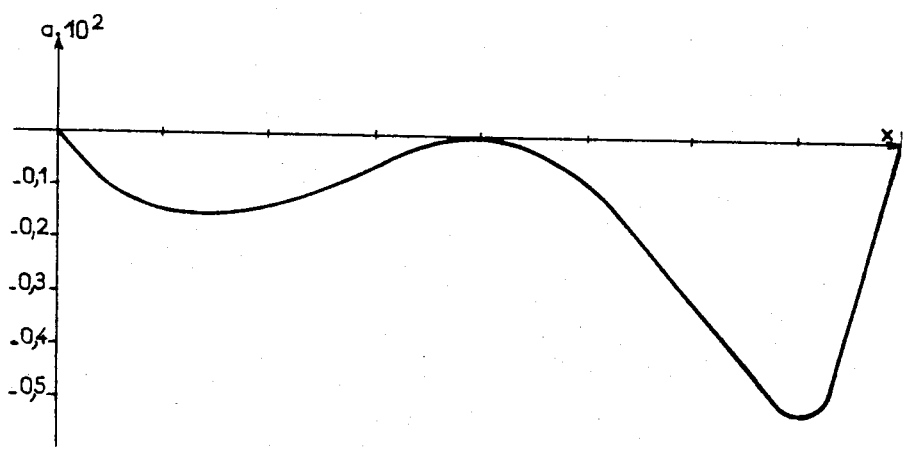
FIGURES 7 and 8 show the variations in position of the images provided in two particular cases.

FIGURE 7 illustrates the amplitude $a$ of displacements of the image after the lens $L_8$, as a function of the distance $x$ separating $L_1$ and $L_2$. It will be seen in this graph that the plane of the image passes four times through the same position The curve being a tangent for the middle of the stroke this point is a double point.

Figure 8:
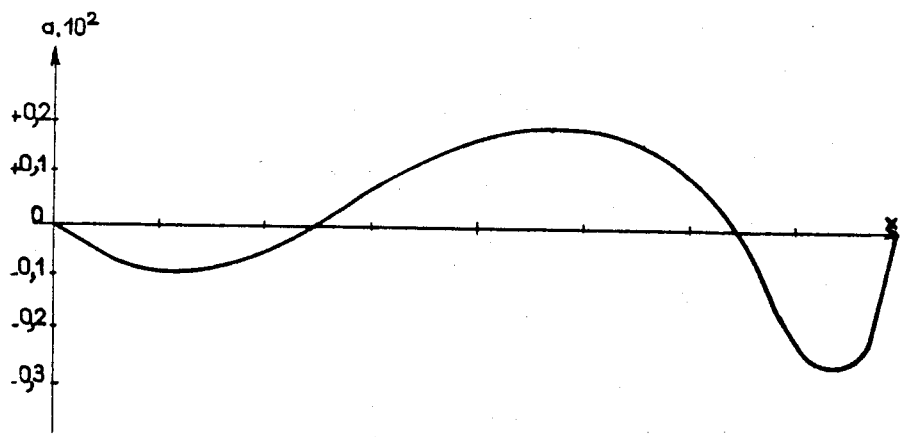

However, it is not essential to make the system afocal at the middle of the stroke. Any point on the latter may be chosen, the calculation then being slightly more complicated The curve of the amplitude $a$ of displacements likewise passes four times through the same position, the double point being eliminated, FIGURE 8.

Figure 9:
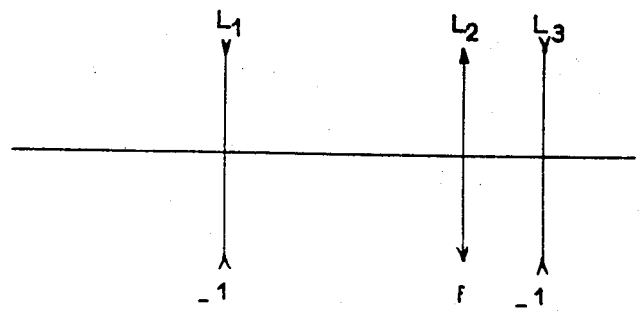
FIGURES 9 and 10 illustrate the method of calculation for a variant of embodiment.

The foregoing theory had as its starting point a system of three thin lenses (FIGURE 1) whereof the first and third had a power of $+1$. It will be shown that it is also possible to take a system of three lenses whereof the first and last have a power of $-1$. FIGURE 9. Working in exactly the same manner as before gives:

$$f=\frac{1}{1+g} \qquad (6)$$

$$d=\frac{1-g}{g} \qquad (7)$$

$d$ necessarily being positive $0<g<1$ $$\overline{AP'}=p'=\frac{1}{2}+\frac{g^2+2g-1}{2g(1+g^2)} \qquad (8)$$

$$\overline{S_5P'}=\overline{S_5A}+\overline{AP'}=p'-x \qquad (9)$$

$$f'=\frac{1-2x}{2-2x}$$

$$p'-x=-2f'=+\frac{1-2x}{1-x}$$

that is:

$$f(x)=x^2-x(p'-1)+p'-1=0 \qquad (10)$$

This equation has real roots only if $p'-1$ is negative. Now:

$$1-p'=\frac{1}{2}-\frac{g^2+2g-1}{2g(1+g^2)}$$

is the function previously investigated.

Figure 10:
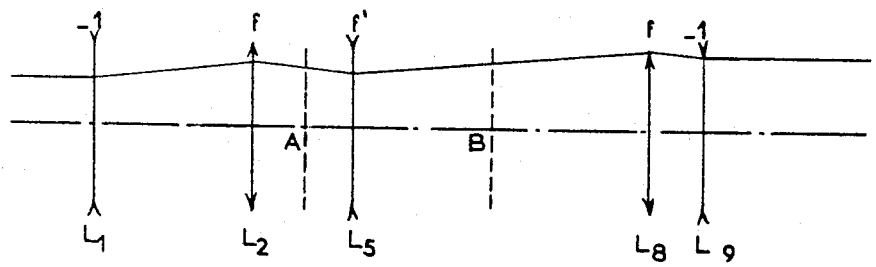

$1-p'$ is always positive except for $-1<g<0$, and therefore $p'-1$ is negative within the limits to be considered $0<g<1$. The equation always has one positive root, and there is always a solution. This leads to a system diagrammatically illustrated in FIGURE 10. It will be noted that in this case there is only one possible solution, corresponding to $f$ positive and $f'$ negative.

*Example.*—If $g$ is made equal to 0.7

$$f=0.588235$$

$$d=0.428571$$

$$p'=\frac{1}{2}+\frac{0.49+1.4-1}{1.4+1.49}$$

the equation $f(x)$ becomes:

$$x^2+0.073346x-0.073346=0$$

whence $$2x=0.473247$$

$$f'=-0.345015$$

The system is then completely defined.

When the lenses $L_1$ and $L_2$ are in contact, the system is afocal, and its magnification is: 3.874332.

When $L_2$, $L_5$ and $L_8$ are at mid-stroke, the system is afocal and the magnification is 1. Finally, when $L_2$ and $L_5$ are in contact, the system is afocal and the magnification is 1/3.874332. The ratio between extreme magnifications is $k=(3.874332)^2=15.010448$.

The foregoing shows that a system comprising three lenses moved in proportionate fashion may always be made the subject of calculation, the first and third having the same movement, while the middle one is displaced in the opposite direction in the ratio of $2x/d$.

These systems give a straight or reversed image of continuously varying size of a fixed object, the ratio of extreme sizes having a value $k$ which is fixed in advance. However, the present invention is not limited to these systems.

The movable elements may be controlled by helical ramps. However, in the case in which there is too large a variation in magnification, image-displacement corresponding to the large amplitudes of the curves 7 and 8 may become troublesome. In this case, and without departing from the limits of the invention, one of the helices may be slightly distorted so as to reduce the large amplitudes. The two movements are then no longer strictly proportional, but are substantially proportional.

The invention is naturally not limited by the details of the forms of embodiment which have just been described: the latter could be modified without departing from the scope of the invention.

I claim:

1. Optical system of variable focal length, comprising three consecutive elements movable with respect to a fixed object, each element being equivalent to a thin lens, to two end movable elements being identical and having identical displacements, a control device for said movable optical elements imparting substantially proportional simultaneous displacement to said end elements in the same direction and to said intermediate element in the opposite direction over definite distances, the system giving an image of the fixed object which image passes four times through a fixed plane when said optical elements traverse said definite distances, said end elements having a focal length $f$ and a displacement over a distance $d$, said intermediate element having a focal length $f'$ and a displacement between said end elements over a distance $2x$, said intermediate element contacting one of said end elements at the ends of its displacement, the magnification $g$ of the system having a predetermined value defined by the inequalities $g<-1$ or $g>1$, the values of $f$, $f'$, $d$ and $2x$ then being determined by the formulae:

$$f = -\frac{1}{1+g}$$

$$d = \frac{g-1}{g}$$

$$\frac{1}{f'} = \frac{1+1}{2x+1}$$

$$p' = \frac{1}{2} - \frac{g^2+2g-1}{2g(1+g^2)}$$

$$x^2 - x(p'+1) - (1+p') = 0$$

the system being further characterized by $g=1.3$, $f=-0.434782$, $d=0.230769$, $p'=-0.970403$ and $f'=0.578937$.

2. Optical system of variable focal length, comprising three consecutive elements movable with respect to a fixed object, each element being equivalent to a thin lens, the two end movable elements being identical and having identical displacements, a control device for said movable optical elements imparting substantially proportional simultaneous displacement to said end elements in the same direction and to said intermediate element in the opposite direction over definite distances, the system giving an image of the fixed object which image passes four times through a fixed plane when said optical elements traverse said definite distances, said end elements having a focal length $f$ and a displacement over a distance $d$, said intermediate element having a focal length $f'$ and a displacement between said end elements over a distance $2x$, said intermediate element contacting one of said end elements at the ends of its displacement and the magnification $g$ the system having a predetermined value between 0 and 1, the values of $f$, $f'$, $d$ and $2x$ then being determined by the formula:

$$f = \frac{1}{1+g}$$

$$d = \frac{1-g}{g}$$

$$f' = \frac{2x-1}{2-2x}$$

$$p' = \frac{1}{2} + \frac{g^2+2g-1}{2g(1+g^2)}$$

$$x^2 - x(p'-1) + p' - 1 = 0$$

the system being further characterized by $g=0.7$, $f=0.588235$, $d=0.428571$, $p'-1=-0.073346$ and $f'=-0.345015$.

3. Optical system of variable focal length according to claim 1, characterized in that the optical system comprises an objective situated in the path of the light rays entering the optical elements, the image-focus of the said objective being situated in the plane of the fixed object, so as to form an image of an object at infinity, which image constitutes the fixed object.

References Cited by the Examiner

UNITED STATES PATENTS

| 2,782,684 | 2/1957 | Hopkins | 88—57 |
| 3,192,829 | 7/1965 | Yamaji | 88—57 |

JEWELL H. PEDERSEN, *Primary Examiner.*

JOHN K. CORBIN, *Examiner.*